(12) United States Patent
Avidane et al.

(10) Patent No.: US 12,405,071 B2
(45) Date of Patent: Sep. 2, 2025

(54) HEAT EXCHANGER SYSTEMS AND DEVICES FOR REDUCED PRESSURE LOSS

(71) Applicant: Raytheon Technologies Corporation, Farmington, CT (US)

(72) Inventors: Orin G. Avidane, Lighthouse Point, FL (US); Javier A. Cue, Palm Beach Gardens, FL (US); Ryan William Hunter, North Palm Beach, FL (US)

(73) Assignee: RTX Corporation, Farmington, CT (US)

( * ) Notice: Subject to any disclaimer, the term of this patent is extended or adjusted under 35 U.S.C. 154(b) by 254 days.

(21) Appl. No.: 18/153,936

(22) Filed: Jan. 12, 2023

(65) Prior Publication Data
US 2024/0240879 A1   Jul. 18, 2024

(51) Int. Cl.
*F28F 9/02* (2006.01)
*F28D 9/00* (2006.01)
*F28F 3/04* (2006.01)

(52) U.S. Cl.
CPC ............. *F28F 3/044* (2013.01); *F28D 9/005* (2013.01); *F28D 9/0056* (2013.01)

(58) Field of Classification Search
CPC ......... F28F 3/044; F28D 9/005; F28D 9/0056
USPC ....................................................... 165/173
See application file for complete search history.

(56) References Cited

U.S. PATENT DOCUMENTS

| 10,821,509 | B2 | 11/2020 | Manteiga et al. |
| 2012/0017605 | A1 | 1/2012 | Slabaugh et al. |
| 2015/0285569 | A1 | 10/2015 | Glenn |
| 2016/0359211 | A1 | 12/2016 | Kenney et al. |
| 2020/0240721 | A1* | 7/2020 | Kenney .................. F28D 1/035 |

FOREIGN PATENT DOCUMENTS

| CA | 2964617 | 11/2017 |
| CA | 2976534 | 2/2018 |
| JP | 2007073192 | 3/2007 |
| RU | 2707237 | 11/2019 |

OTHER PUBLICATIONS

European Patent Office, European Search Report dated May 3, 2024 in Application No. 23213817.2.

* cited by examiner

*Primary Examiner* — Davis D Hwu
(74) *Attorney, Agent, or Firm* — SNELL & WILMER L.L.P.

(57) ABSTRACT

A heat exchanger can comprise: a housing; a heat transfer region disposed within the housing; and an inlet manifold or an inlet conduit defined at least partially by an interior surface extending axially from a first end of the heat exchanger to an inlet defined by the heat transfer region, the inlet manifold or the inlet conduit comprising a dimple configuration disposed in the interior surface. The heat exchanger can further comprise an outlet manifold or an outlet conduit including a dimple configuration disposed on an interior surface of the outlet manifold or outlet conduit.

16 Claims, 6 Drawing Sheets

HEAT EXCHANGER SYSTEMS AND DEVICES FOR REDUCED PRESSURE LOSS

FIELD

The present disclosure relates to heat exchangers, and, more specifically, to heat exchanger systems and devices for reduced pressure loss.

BACKGROUND

A gas turbine engine typically includes a fan section, a compressor section, a combustor section, and a turbine section. In general, during operation, air is pressurized in the fan and compressor sections, and is mixed with fuel, and burned in the combustor section to generate hot combustion gases. The hot combustion gases flow through the turbine section, which extracts energy from the hot combustion gases to power the compressor section and other gas turbine engine loads.

Gas turbine engines may include various cooling systems that employ heat exchangers. Bypass air may be directed across the heat exchangers as a cooling fluid. The inlet piping, or outlet piping of the heat exchanger (i.e., the bypass air exiting the heat exchanger) may cause pressure loss that may otherwise be used to drive heat rejection in the heat exchanger. A significant loss in pressure at inlets and outlets of heat exchangers can greatly reduce a heat exchanger performance.

SUMMARY

A heat exchanger is disclosed herein. In various embodiments, the heat exchanger comprises a housing; a heat transfer region disposed within the housing; and an inlet manifold defined at least partially by an interior surface extending axially from a first end of the heat exchanger to an inlet defined by the heat transfer region, the inlet manifold comprising a dimple configuration disposed in the interior surface.

In various embodiments, the dimple configuration comprises a plurality of dimples spaced apart axially along the interior surface. The dimple configuration can further comprise rows of the plurality of dimples spaced apart laterally along the interior surface.

In various embodiments, each dimple in the plurality of dimples comprises a first diameter in a X-direction, a second diameter in a Y-direction, and a depth of dimple, the depth of dimple measured from the interior surface to a max depth of the dimple.

In various embodiments, the heat exchanger further comprises an outlet manifold in fluid communication with the inlet manifold through the heat transfer region, the outlet manifold comprising the dimple configuration. In various embodiments, the heat exchanger further comprises an inlet fluid conduit and an outlet fluid conduit, the inlet fluid conduit in fluid communication with the outlet fluid conduit through the heat transfer region. In various embodiments, the inlet fluid conduit and the outlet fluid conduit each comprise the heat transfer region.

A heat exchanger is disclosed herein. In various embodiments, the heat exchanger comprises a housing; a heat transfer region disposed within the housing; and an inlet fluid conduit extending from a first end to an inlet of the housing, the inlet defined by the heat transfer region, the inlet fluid conduit defining an interior surface and comprising a dimple configuration disposed in the interior surface.

In various embodiments, the interior surface is a cylindrical surface. In various embodiments, the dimple configuration comprises a plurality of dimples spaced apart axially along the interior surface. In various embodiments, the dimple configuration comprises rows of the plurality of dimples spaced apart circumferentially along the cylindrical surface. In various embodiments, each dimple in the plurality of dimples comprises a first diameter in a X-direction, a second diameter in a Y-direction, and a depth of dimple, the depth of dimple measured from the interior surface to a max depth of the dimple.

In various embodiments, the heat exchanger further comprises an outlet fluid conduit in fluid communication with the inlet fluid conduit through a fluid conduit in the heat transfer region, the outlet fluid conduit comprising the dimple configuration. In various embodiments, the fluid conduit in the heat transfer region is without dimples.

In various embodiments, the heat exchanger further comprises an inlet manifold and an outlet manifold, the inlet manifold in fluid communication with the outlet manifold through the heat transfer region.

A gas turbine engine is disclosed herein. In various embodiments, the gas turbine engine comprises: a heat exchanger comprising a heat transfer region; an inlet manifold and an outlet manifold; the outlet manifold in fluid communication with the inlet manifold through the heat transfer region; a supply conduit; and a return conduit in fluid communication with the supply conduit through the heat transfer region of the heat exchanger, wherein an interior surface of at least one of the supply conduit, the return conduit, the inlet manifold and the outlet manifold comprises a dimple configuration.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts, but not necessarily to denote the same or different materials.

Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of a gas turbine engine.

A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to reference axes other than the engine central longitudinal axis.

Disclosed herein are systems and apparatuses for improving a heat exchanger performance. Although disclosed herein with reference to gas turbine engines, the present disclosure is not limited in this regard. For example, any heat exchanger used in any type of application is within the scope of this disclosure. In various embodiments, an interior surface of an inlet manifold and/or an outlet manifold for a heat exchanger comprises a dimpled configuration. In various embodiments, the inlet manifold and/or the outlet manifold can be integral with the heat exchanger. In various embodiments, the inlet manifold and/or the outlet manifold can be configured to be coupled to the heat exchanger. The present disclosure is not limited in this regard. In various embodiments, the dimpled configuration may result in less separation of a boundary layer against the interior surface. In this regard, the dimpled configuration can reduce a pressure loss at an inlet and/or an outlet of a heat exchanger, resulting in improved performance of the heat exchanger, in accordance with various embodiments.

Figure 1:
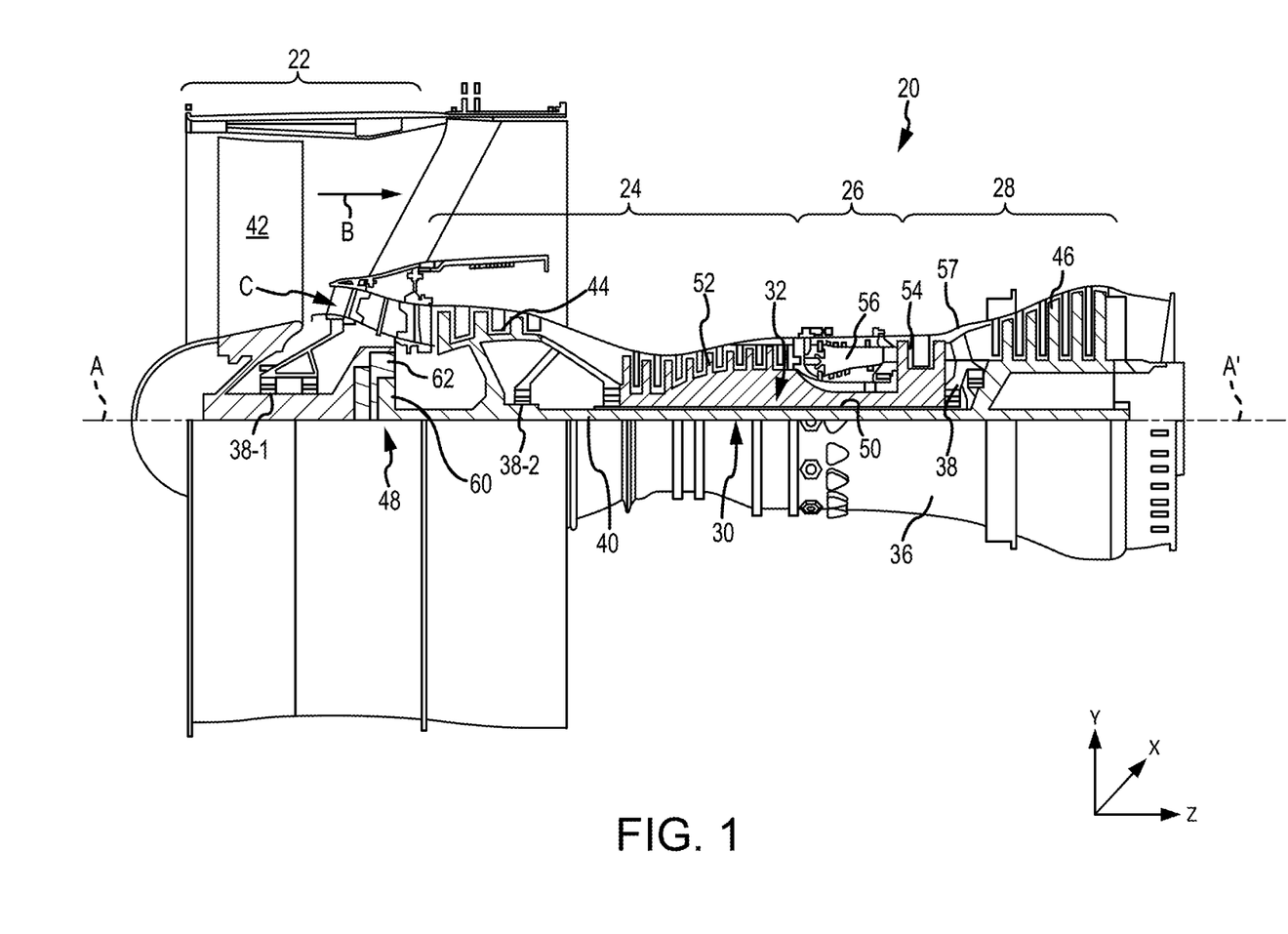
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may generally include a fan section 22, a compressor section 24, a combustor section 26, and a turbine section 28. In operation, fan section 22 drives fluid (e.g., air) along a bypass flow-path B, while compressor section 24 drives fluid along a core flow-path C for compression and communication into combustor section 26 and then expansion through turbine section 28. Although gas turbine engine 20 is depicted as a turbofan gas turbine engine herein, it should be understood that the concepts described herein are not limited to use with turbofans as the teachings may be applied to other types of turbine engines.

Gas turbine engine 20 may generally comprise a low speed spool 30 and a high speed spool 32 mounted concentrically, via bearing systems 38, for rotation about for rotation about engine central longitudinal axis A-A' and relative to an engine static structure 36. It should be understood that various bearing systems 38 at various locations may alternatively or additionally be provided, including for example, bearing system 38, bearing system 38-1, and bearing system 38-2. Engine central longitudinal axis A-A' is oriented in the z direction on the provided xyz axes. The z direction on the provided xyz axes refers to the axial direction. As used herein, the term "radially" refer to directions towards and away from engine central longitudinal axis A-A' and the z-axis. As used herein, the terms "circumferential" and "circumferentially" refer to directions about central longitudinal axis A-A' and the z-axis.

Low speed spool 30 may generally comprise an inner shaft 40 that interconnects a fan 42, a low-pressure compressor 44, and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. A combustor 56 may be located between high pressure compressor 52 and high-pressure turbine 54. A mid-turbine frame 57 of engine static structure 36 may be located generally between high pressure turbine 54 and low-pressure turbine 46. Mid-turbine frame 57 may support one or more bearing systems 38 in turbine section 28. Inner shaft 40 and outer shaft 50 may be concentric and rotate via bearing systems 38 about engine central longitudinal axis A-A', which is collinear with their longitudinal axes. As used herein, a "high pressure" compressor or turbine experiences a higher pressure than a corresponding "low pressure" compressor or turbine. The airflow in core flow-path C may be compressed by low pressure compressor 44 and high-pressure compressor 52, mixed and burned with fuel in combustor 56, then expanded over high-pressure turbine 54 and low-pressure turbine 46. Turbines 46, 54 rotationally drive the respective low speed spool 30 and high-speed spool 32 in response to the expansion.

The compressor section 24, the combustor section 26, and the turbine section 28 are generally referred to as the engine core. Air is drawn into gas turbine engine 20 through fan 42. Air exiting fan 42 may be divided between core flow-path C and bypass flow-path B. The airflow in bypass flow-path B may be utilized for multiple purposes including, for example, cooling and pressurization.

Figure 2:
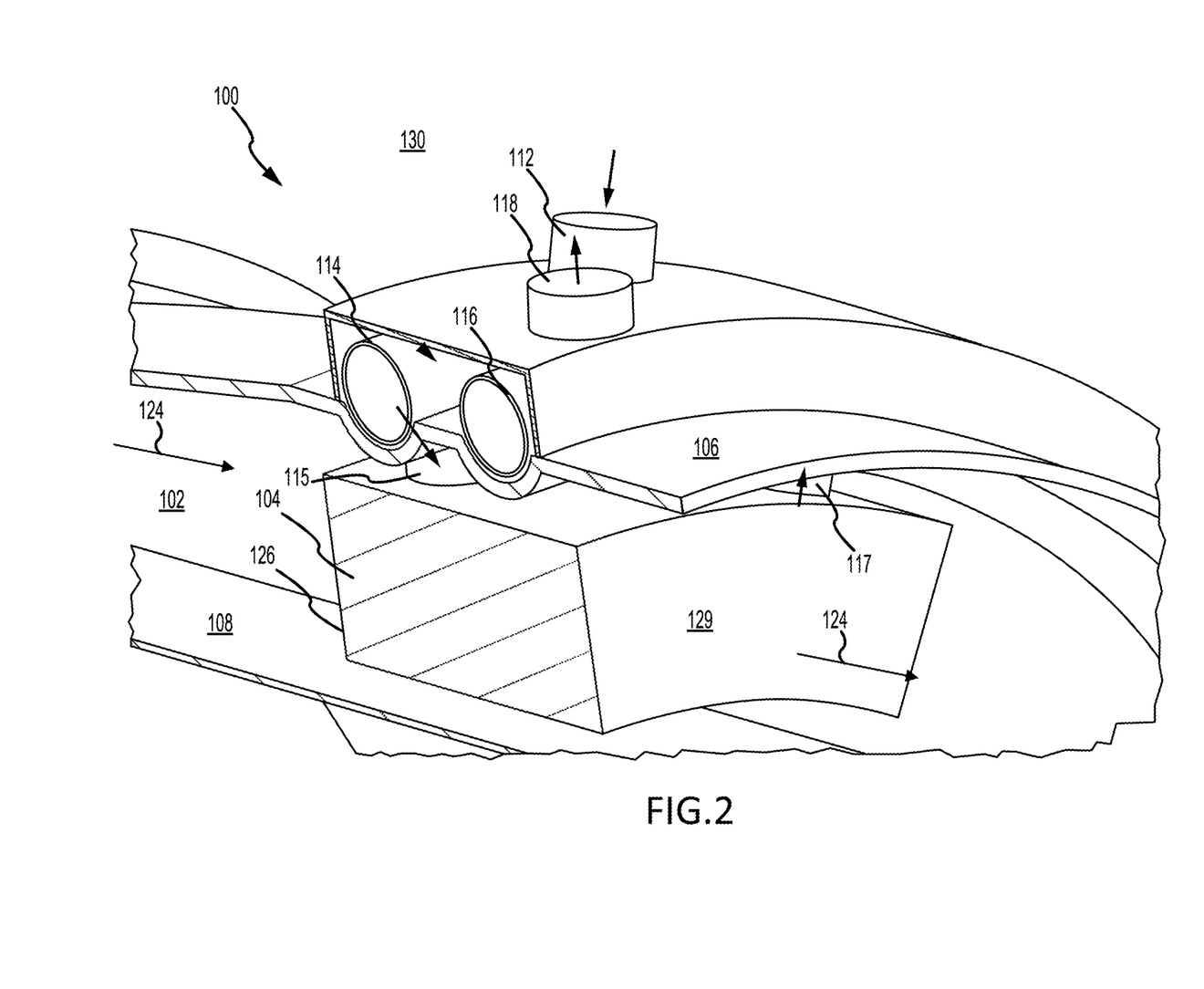
FIG. 2 illustrates a perspective view of a cooling system having a plenum, in accordance with various embodiments.

Referring to FIG. 2, and with continued reference to FIG. 1, a cooling system 100 having a heat exchanger 104 is illustrated, in accordance with various embodiments. The heat exchanger 104 may be located between an outer engine case structure 106 and an inner engine case structure 108. Outer engine case structure 106 is radially outward of inner engine case structure 108. Outer engine case structure 106 and inner engine case structure 108 may define a generally annular bypass duct 102 around the engine core. In various embodiments, inner engine case structure 108 may form a portion of engine static structure 36. In various embodiments, air discharged from, for example, fan section 22 may be communicated through the bypass duct 102.

In various embodiments, the cooling system 100 comprise a supply conduit 114 and a return conduit 116. In accordance with various embodiments, an inlet conduit 112 may be fluidly coupled between an external source from an aircraft proximate engine bay 130 and a supply conduit 114. Engine bay 130 may be disposed radially outward from outer engine case structure 106. Supply conduit 114 may extend circumferentially about outer engine case structure 106 and/or form an annular tube. The external source from the aircraft may be disposed radially outward of outer engine case structure 106. Inlet conduit 112 directs hot air (i.e., air to be cooled) to heat exchanger 104. Inlet conduit 112 is fluidly coupled to an inlet conduit 115 of heat exchanger 104. Supply conduit 114 may be fluidly coupled to each heat exchanger 104 by the inlet conduit 115 extending radially inward from supply conduit 114 through outer engine case structure 106.

In accordance with various embodiments, an outlet conduit 118 may be fluidly coupled between an external destination from an aircraft proximate engine bay 130 and return conduit 116. Return conduit 116 may extend circumferentially about outer engine case structure 106 and/or form an annular tube. The external destination from the aircraft may be disposed radially outward of outer engine case structure 106. Outlet conduit 118 directs cool air (i.e., air that is cooled by heat exchanger 104) to the external destination. Outlet conduit 118 is fluidly coupled to an outlet conduit 117 of heat exchanger 104. Return conduit 116 may be fluidly coupled to each heat exchanger 104 by the outlet conduit 117 extending radially inward from return conduit 116 through outer engine case structure 106.

The hot air provided by inlet conduit 112 is cooled in heat exchanger 104 and then returned to the external source from the aircraft through a return conduit 116. Return conduit 116 is fluidly coupled to an outlet conduit 117 of heat exchanger 104 and outlet conduit 118. The cooled air in return conduit 116 may be directed downstream to cool components in thermally challenged regions.

Heat exchanger 104 is configured to receive a cooling airflow, for example, airflow 124. In various embodiments, airflow 124 may be a portion of the bypass airflow in bypass duct 102. Cooling airflow 124 may be directed through an inlet manifold 126 across heat exchanger 104 and out an outlet manifold 129 to cool the air supplied from inlet conduit 115 in heat exchanger 104.

Figure 3:
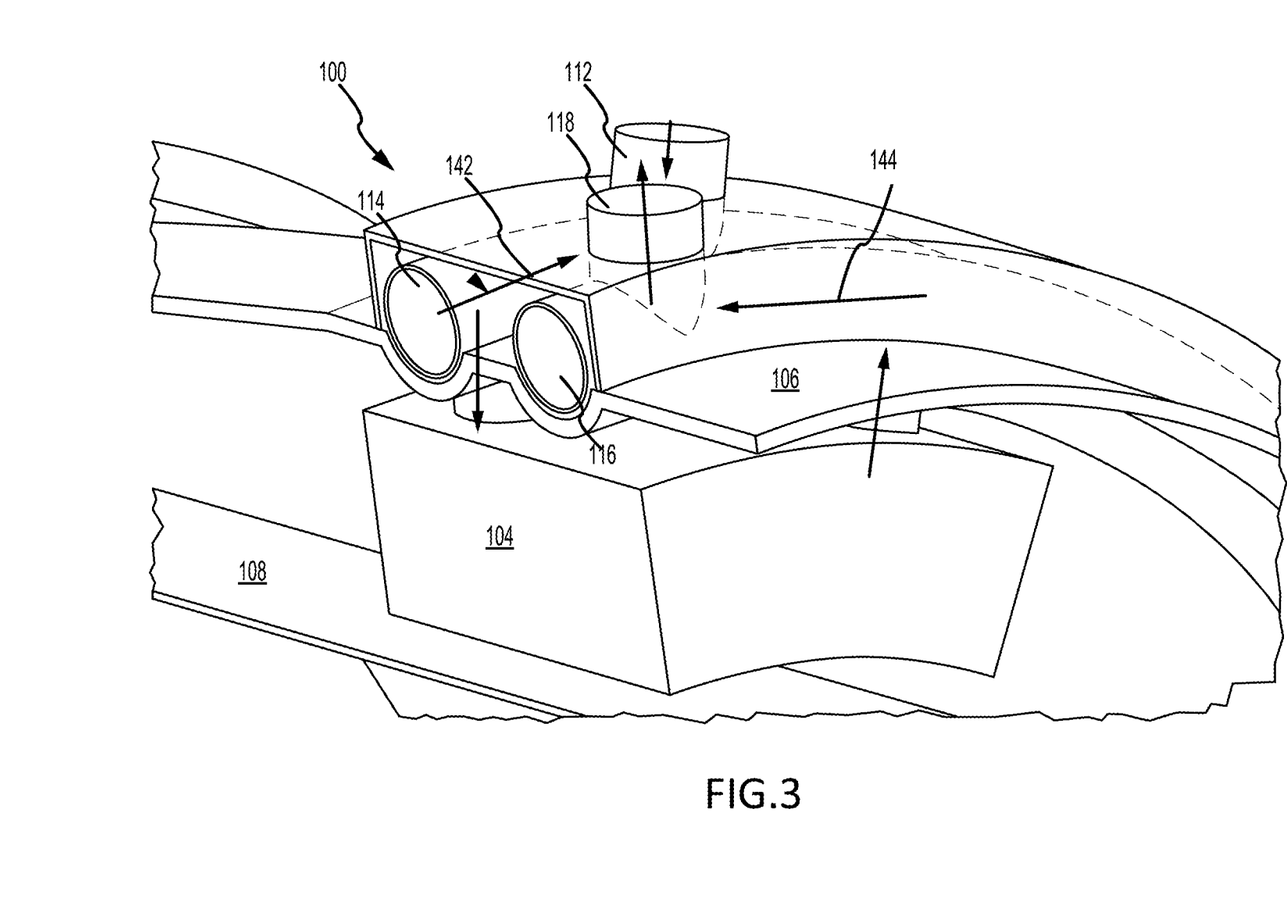
FIG. 3 illustrates a perspective view of a cooling system having a plenum, in accordance with various embodiments.

Referring to FIG. 3, a cooling system 100 having a heat exchanger 104 is illustrated, in accordance with various embodiments. In various embodiments, inlet conduit 112 may be integral to supply conduit 114. Similarly, outlet conduit 118 may be integral to return conduit 116. "Integral," as referred to herein is a monolithic component. In various embodiments, hot air may flow through supply conduit 114 in a first circumferential direction 142 and the return cooler air may flow though return conduit 116 in a second circumferential direction 144. The first circumferential direction 142 and the second circumferential direction 144 may be opposite directions.

Figure 4A:
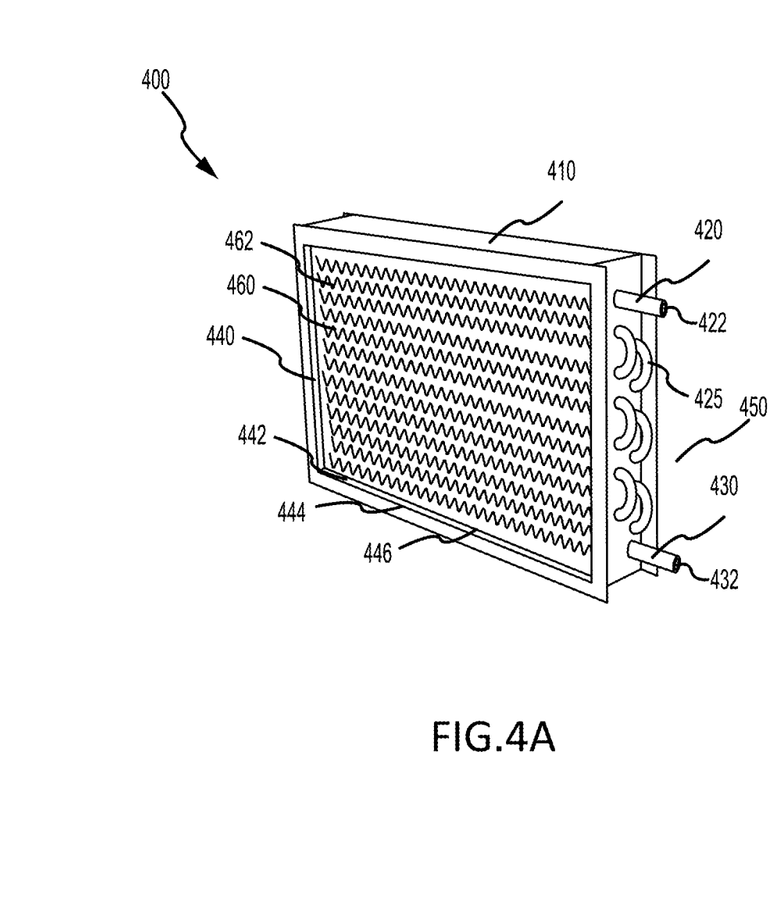
FIG. 4A illustrates a perspective view of a heat exchanger, in accordance with various embodiments.

Referring now to FIG. 4, a perspective view of a heat exchanger 400 is illustrated, in accordance with various embodiments. In various embodiments, the heat exchanger 104 from FIGS. 2 and 3 can be in accordance (i.e., can contain the same features), with the heat exchanger 400 as described further herein. In various embodiments, the heat exchanger 400 comprises a housing 410, an inlet conduit 420, an outlet conduit 430, an inlet manifold 440, an outlet manifold 450, and a heat transfer region 460. "A heat transfer region" as referred to herein is a portion of the heat exchanger where a first fluid (e.g., air, a working fluid or the like) interacts with a second fluid (e.g., air, a working fluid or the like), to transfer heat from the first fluid to the second fluid or vice versa. In various embodiments, the first fluid and the second fluid can be any fluid for use in a heat exchanger. For example, air, water, fuel, oil, or any other fluid utilized in heat exchangers are within the scope of this disclosure.

In various embodiments, the inlet conduit 420 is in fluid communication with the outlet conduit 430 through the heat transfer region 460. For example, a fluid conduit 425 extends through the heat transfer region 460, and sometimes out of the heat transfer region 460 from the inlet conduit 420 to the outlet conduit 430. Similarly, the inlet manifold 440 is in fluid communication with the outlet manifold 450 through the heat transfer region 460.

In various embodiments, the inlet manifold 440 is defined by an interior surface 442 that extends axially from a first edge 444 disposed at a first axial end of the heat exchanger 400 to a second edge 446 defined by an inlet 462 to the heat transfer region 460. Similarly, in accordance with various embodiments, the outlet manifold 450 is in accordance with the inlet manifold (i.e., with an interior surface that extends axially from a first edge defined by an outlet of the heat transfer region to a second edge defined by a second axial end of the heat exchanger 400.

In various embodiments, the inlet conduit 420 comprises an interior surface 422 and the outlet conduit 430 comprises an interior surface 432. Although described herein as having an inlet manifold 440 and an outlet manifold 450 with an inlet conduit 420 and an outlet conduit 430, the present disclosure is not limited in this regard. For example, a heat exchanger with two inlet manifolds and two outlet manifolds or a heat exchanger with two inlet conduits and two outlet conduits (e.g., FIG. 4B) are within the scope of this disclosure.

Figure 4B:
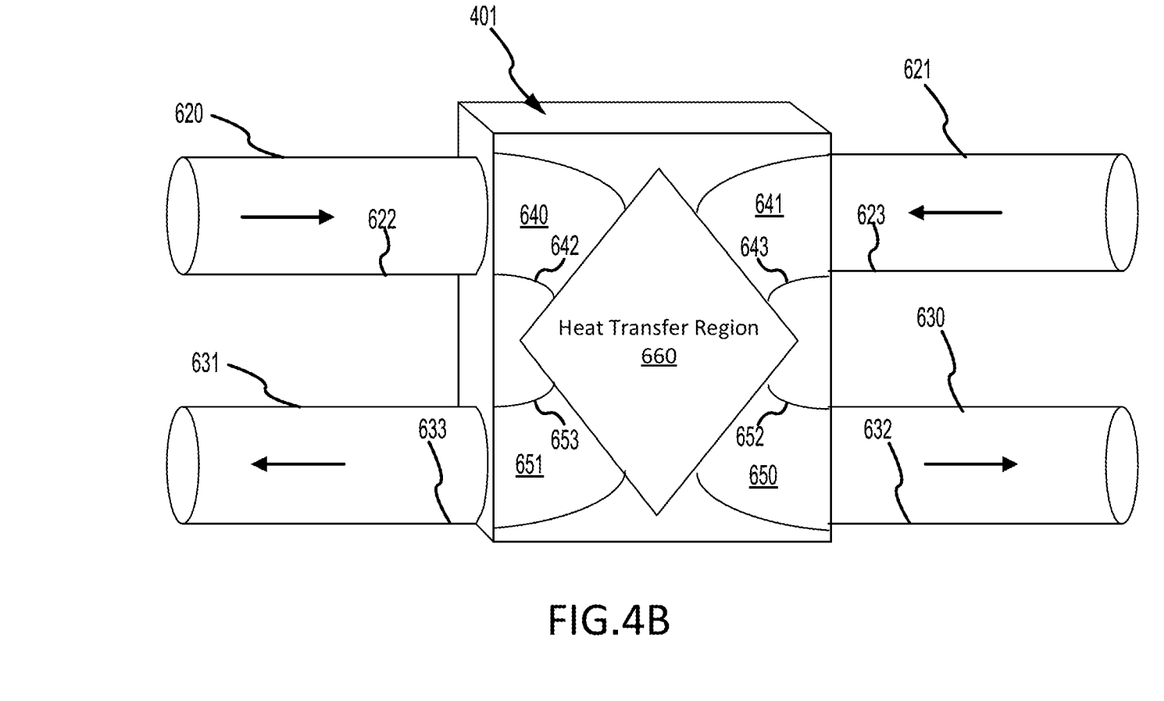
FIG. 4B illustrates a side view of a heat exchanger, in accordance with various embodiments.

Referring now to FIG. 4B, a side view of a heat exchanger 401 with two inlet conduits (e.g., inlet conduit 620 and inlet conduit 621) and two outlet conduits (e.g., outlet conduit 630 and outlet conduit 631) is illustrated, in accordance with various embodiments. In various embodiments, the inlet conduits 620, 621 are in accordance with the inlet conduit 420, and the outlet conduits 630, 631 are in accordance with the outlet conduit 430 from FIG. 4A.

In various embodiments, the heat exchanger 401 comprises inlet manifolds 640, 641 and outlet manifolds 650, 651. For example, the inlet manifold 640 can be disposed between the inlet conduit 620 and the heat transfer region 660 within the heat exchanger 401. Similarly, the inlet manifold 641 can be disposed between the inlet conduit 621 and the heat transfer region 660, the outlet manifold 650 can be disposed between the outlet conduit 630 and the heat transfer region 660, and the outlet manifold 651 can be disposed between the outlet conduit 631. However, the present disclosure is not limited in this regard. For example, an outlet of the inlet conduit 620 can be the heat transfer region 660 directly and would still be within the scope of this disclosure.

In various embodiments, a first fluid is supplied through the inlet conduit 620 to a heat transfer region 660 and exhausted out the outlet conduit 630. Similarly, a second fluid is supplied through the inlet conduit 621 to the heat transfer region 660 and out the outlet conduit 631. In various embodiments, the first fluid is at a first temperature that is greater than the second fluid. In this regard, the heat transfer region 660 is configured to decrease the first temperature of the first fluid and increase the temperature of the second fluid. For example, in accordance with various embodiments, an air-to-air heat exchanger may extract the first fluid that is 22 degree F. above ambient in the inlet conduit 620 and extract a second fluid that is 10 degrees F. below ambient from the inlet conduit 621. As a result, in accordance with various embodiments, the second fluid may be heated up to approximately 15 degrees F. above ambient and exhausted out the outlet conduit 631, and the first fluid may be cooled down to approximately 5 degrees above ambient and exhausted out the outlet conduit 630.

Although described with respect to an air-to-air heat exchanger, the present disclosure is not limited in this regard. Any fluid-to-fluid heat exchanger is within the scope of this disclosure. For example, various fluids and media may be circulated throughout the heat exchangers 400, 401 during operation and may carry heat including, without limitation, air, fuel, oil, lubricating fluid, hydraulic fluid, thermally neutral heat-transfer fluid, or any other fluid suitable for circulating through a heat exchanger 400, 401.

In various embodiments, each inlet conduit, outlet conduit, inlet manifold and outlet manifold of the heat exchanger 401 each comprise an interior surface configured to reduce a pressure less in the heat exchanger 401. For example, the inlet conduit 620 comprises an interior surface 622, the inlet conduit 621 comprises an interior surface 623, the outlet conduit 630 comprises an interior surface 632, the outlet conduit 631 comprises an interior surface 633, the inlet manifold 640 comprises an interior surface 642, the inlet manifold 641 comprises an interior surface 643, the outlet manifold 650 comprises an interior surface 652, and the outlet manifold 651 comprises an interior surface 653.

Figure 5A:
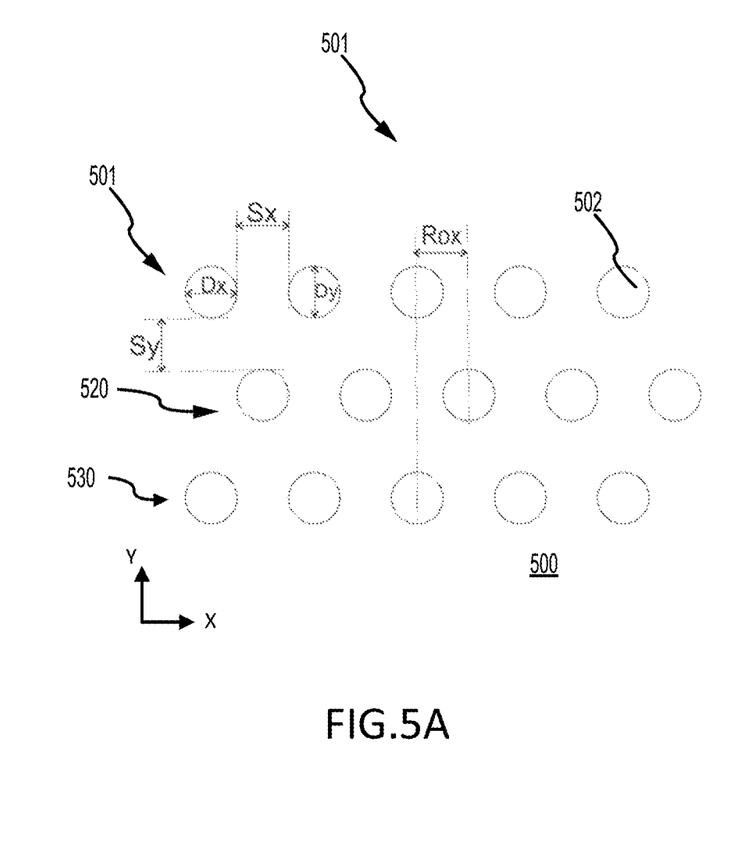
FIG. 5A illustrates a top view of an interior surface with a dimple configuration, in accordance with various embodiments.
Figure 5B:
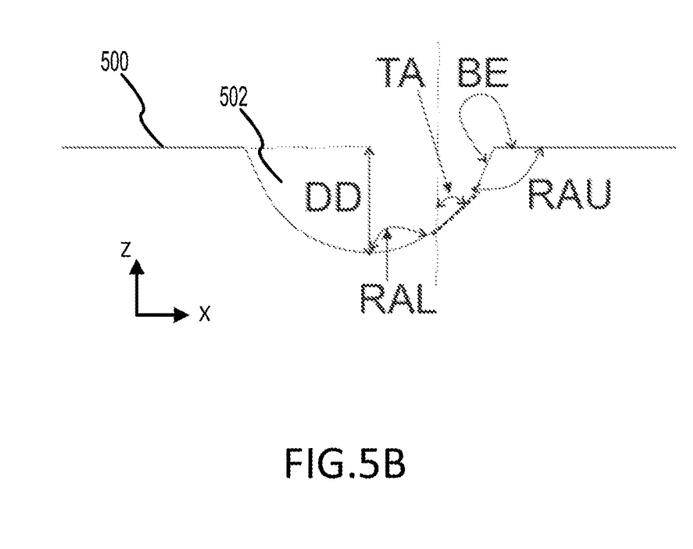
FIG. 5B illustrates a cross-sectional view of the interior surface with a dimple of the dimple configuration, in accordance with various embodiments.

Referring now to FIGS. 5A and 5B, a top view (FIG. 5A) and a cross-sectional view (FIG. 5B) of an interior surface 500 (e.g., any of interior surfaces 422, 432, 442, 622, 623, 632, 633, 642, 643, 652, 653 and/or an interior surface of outlet manifold 450 from FIGS. 4A and 4B) is illustrated, in accordance with various embodiments. In various embodiments, the interior surface can be a cylindrical surface (e.g., for inlet conduit 420, 620, 621 and/or outlet conduit 430, 630, 631), a flat surface (e.g., for inlet manifold 440 or outlet manifold 450), or the like. The present disclosure is not limited in this regard.

Figure 5C:
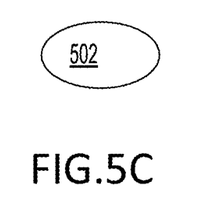
FIG. 5C illustrates an elliptical view of the interior surface with a dimple of the dimple configuration, in accordance with various embodiments.

In various embodiments, the interior surface 500 comprises a dimple configuration 501 with a plurality of dimples (e.g., dimple 502). In various embodiments, each dimple (e.g., dimple 502) can be the same for ease of manufacturing. However, the present disclosure is not limited in this regard, and varying dimple sizes (i.e., diameter and depth) throughout the dimple configuration 501 is within the scope of this disclosure. In various embodiments, the dimple 502 comprises a diameter in an X-direction ("Dx") and a diameter in a Y-direction ("Dy"). The X-direction can correspond to a axial direction (i.e., an axial direction of a fluid conduit or an axial direction of a manifold as shown in FIG. 4), and the Y-direction can correspond to a circumferential direction (i.e., for a fluid conduit) or a lateral direction (i.e., for a manifold defined by a flat surface). From a top view (FIG. 5A), the dimple 502 can comprise an elliptical shape (e.g., as shown in FIG. 5C), in accordance with various embodiments. Although the dimple 502 is illustrated as a circular cross-section in an XY plane, the present disclosure is not limited in this regard. For example, diameter Dx can vary between 0.007 inches (0.018 cm) and 2.9 inches (7.366 cm), and diameter Dy can vary between 0.007 inches (0.018 cm) and 2.9 inches (7.366 cm), in accordance with various embodiments.

In various embodiments, dimples 502 can be spaced apart in the X-direction ("Sx"), and the dimples 502 can be spaced apart in the Y-direction ("Sy"). For example, Sy and Sx can each vary between 0.001 inches (0.0025 cm) and 1.9 inches (4.83 cm). Although illustrated as being spaced apart equally in the x-direction and spaced apart equally in the y-direction, the present disclosure is not limited in this regard. For example, the dimple configuration 501 can comprise arrays of dimples (e.g., two or more dimples 502 spaced close together (e.g., 0.001 inches (0.0025 cm) then a larger gap (e.g., 1 inch (2.54 cm)), then have the pattern repeat.

In various embodiments, the dimple configuration 501 comprises a plurality of dimples arranged in rows (e.g., rows 510, 520, 530 as shown in FIG. 5A). In various embodiments, adjacent rows (e.g., rows 510, 520) can be offset in an X direction ("Rox"). In various embodiments, the Rox corresponds to two times the Sx direction.

Referring now to FIG. 5B, a cross-sectional view of a dimple 502 from FIG. 5A is illustrated, in accordance with various embodiments. In various embodiments, the dimple 502 further comprise a ramp angle upper ("RAU"), a ramp angle lower ("RAL"), a transition angle ("TA"), a break angle ("BE"), and a depth of dimple ("DD"). The RAU is an angle between the interior surface 500, and an interior surface of the dimple 502. The TA is an angle from a vertical reference (i.e., a normal direction from the interior surface 500), and a tangent line between a vertex defined by the dimple 502 and the interior surface 500 and a point defined by the DD. The RAL is an angle between the tangent line and a horizontal plane defined by the DD. The break edge is an angle that transitions the interior surface 500 to an interior surface of the dimple 502.

In various embodiments, the dimple 502 can be a partial sphere. In various embodiments, the dimple 502 can have a depth greater than diameter Dx and diameter Dy or less than diameter Dx and Dy, the present disclosure is not limited in this regard. In various embodiments, the dimple 502 is configured to induce turbulent flow. In various embodiments, turbulent flow can result in reduced pressure loss relative to laminar flow.

In various embodiments, the RAU can be between 90 degrees and 179 degrees. In various embodiments, the RAL can be between 0 degrees and 90 degrees. In various embodiments, the TA can be between 0 degrees and 89 degrees. In various embodiments, the BE can be between 181 degrees and 270 degrees. In various embodiments, the DD can be between 0.001 inches (0.0025 cm) and 1.5 inches (3.81 cm).

In various embodiments, the interior surface 500 can be substantially an entire length of an inlet conduit (e.g., inlet conduit 420 from FIG. 4), an outlet conduit (e.g., outlet conduit 430), an inlet manifold (e.g., inlet manifold 440), an outlet manifold (e.g., outlet manifold 450), a supply conduit (e.g., supply conduit 114), a return conduit (e.g., return conduit 116), or the like. The present disclosure is not limited in this regard. In various embodiments, "substantially the entire length" as referred to herein is between 95% and 100% of a total length as measured from a first end of a conduit (or manifold) to a second end of a conduit (or manifold), the second end being proximate (or adjacent) the heat transfer region 460 of a heat exchanger 400 from FIG. 4, in accordance with various embodiments.

In various embodiments, by having a dimple configuration 501 as disclosed herein, a pressure loss of a fluid entering and exiting a heat exchanger can be reduced, thereby increasing an efficiency of the heat exchanger (e.g., heat exchanger 104 or heat exchanger 400).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat exchanger, comprising:
   a housing;
   a heat transfer region disposed within the housing; and
   an inlet manifold defined at least partially by an interior surface recessed from a first edge to a second edge, the second edge extending axially from a first end of the heat exchanger to an inlet defined by the heat transfer region and disposed transversely with respect to the inlet manifold, the inlet manifold comprising a dimple configuration disposed in the interior surface.

2. The heat exchanger of claim 1, wherein the dimple configuration comprises a plurality of dimples spaced apart axially along the interior surface.

3. The heat exchanger of claim 2, wherein the dimple configuration comprises rows of the plurality of dimples spaced apart laterally along the interior surface.

4. The heat exchanger of claim 2, wherein each dimple in the plurality of dimples comprises a first diameter in a X-direction, a second diameter in a Y-direction, and a depth of dimple, the depth of dimple measured from the interior surface to a max depth of the dimple.

5. The heat exchanger of claim 4, wherein the first diameter in the X-direction and the second diameter in the Y-direction are each between 0.007 inches (0.18 cm) and 2.9 inches (7.4 cm), and the depth of dimple is between 0.001 inches (0.0025 cm) and 1.5 inches (3.81 cm).

6. The heat exchanger of claim 1, further comprising:
   an outlet manifold recessed axially from a second end of the heat exchanger opposing the first end and in fluid communication with the inlet manifold through the heat transfer region, the outlet manifold comprising the dimple configuration; and
   an inlet fluid conduit and an outlet fluid conduit, the inlet fluid conduit in fluid communication with the outlet fluid conduit through the heat transfer region.

7. The heat exchanger of claim 6, wherein the inlet fluid conduit and the outlet fluid conduit each comprise the heat transfer region and extend transversely with respect to the inlet manifold and the outlet manifold.

8. A heat exchanger, comprising:
   a housing;
   a heat transfer region disposed within the housing;
   an inlet fluid conduit extending from a first end to an inlet of the housing, the inlet defined by the heat transfer region, the inlet fluid conduit defining an interior surface and comprising a dimple configuration disposed in the interior surface; and
   an inlet manifold and an outlet manifold, the inlet manifold in fluid communication with the outlet manifold through the heat transfer region.

9. The heat exchanger of claim 8, wherein the interior surface is a cylindrical surface.

10. The heat exchanger of claim 9, wherein the dimple configuration comprises a plurality of dimples spaced apart axially along the interior surface.

11. The heat exchanger of claim 10, wherein the dimple configuration comprises rows of the plurality of dimples spaced apart circumferentially along the cylindrical surface.

12. The heat exchanger of claim 10, wherein each dimple in the plurality of dimples comprises a first diameter in a X-direction, a second diameter in a Y-direction, and a depth of dimple, the depth of dimple measured from the interior surface to a max depth of the dimple.

13. The heat exchanger of claim 4, wherein the first diameter in the X-direction and the second diameter in the Y-direction are each between 0.007 inches (0.18 cm) and 2.9 inches (7.4 cm), and the depth of dimple is between 0.001 inches (0.0025 cm) and 1.5 inches (3.81 cm).

14. The heat exchanger of claim 8, further comprising an outlet fluid conduit in fluid communication with the inlet fluid conduit through a fluid conduit in the heat transfer region, the outlet fluid conduit comprising the dimple configuration, wherein the fluid conduit in the heat transfer region is without dimples.

15. A gas turbine engine comprising the heat exchanger of claim 1, the gas turbine engine further comprising:
   a supply conduit; and
   a return conduit in fluid communication with the supply conduit through the heat transfer region of the heat exchanger.

16. A gas turbine engine comprising the heat exchanger of claim 8, the gas turbine engine further comprising:
   a supply conduit; and
   a return conduit in fluid communication with the supply conduit through the heat transfer region of the heat exchanger.

* * * * *